United States Patent
Gentil et al.

(10) Patent No.: US 9,590,476 B2
(45) Date of Patent: Mar. 7, 2017

(54) SYSTEM FOR PROTECTING AGAINST HEATING FOR A ROTATING ELECTRIC MACHINE, IN PARTICULAR A STARTER

(75) Inventors: Maximilien Gentil, Corbas (FR); Jacques Verot, Lyons (FR); Wilfried Pays, Sermerieu (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 375 days.

(21) Appl. No.: 14/128,827

(22) PCT Filed: Jun. 27, 2012

(86) PCT No.: PCT/FR2012/051482
§ 371 (c)(1),
(2), (4) Date: Feb. 27, 2014

(87) PCT Pub. No.: WO2013/001236
PCT Pub. Date: Jan. 3, 2013

(65) Prior Publication Data
US 2014/0184032 A1  Jul. 3, 2014

(30) Foreign Application Priority Data
Jun. 30, 2011  (FR) ...................................... 11 55910

(51) Int. Cl.
*H02K 11/00* (2016.01)
*H02K 23/66* (2006.01)

(52) U.S. Cl.
CPC ......... *H02K 11/0047* (2013.01); *H02K 11/25* (2016.01); *H02K 23/66* (2013.01)

(58) Field of Classification Search
CPC ..... H02K 11/0047; H02K 23/66; H02K 11/25
(Continued)

(56) References Cited

U.S. PATENT DOCUMENTS

| 4,658,321 A * | 4/1987 | Lindner ............... H01H 37/323 310/238 |
| 4,675,642 A * | 6/1987 | Reiferscheid ........ H01H 37/323 337/140 |

(Continued)

FOREIGN PATENT DOCUMENTS

| FR | 2949626 | 3/2011 | |
| FR | 2966298 A1 * | 4/2012 | ........... H01R 39/385 |
| GB | 621035 | 4/1949 | |

*Primary Examiner* — Alex W Mok
(74) *Attorney, Agent, or Firm* — Berenato & White, LLC

(57) ABSTRACT

A rotating electric machine including at least a first terminal and a second terminal, and an electric circuit connected to said two terminals, the electric circuit including a field winding. The rotating electric machine also includes a thermal protection device (7) arranged in the electric machine. The thermal protection device (7) includes a first electric conductor (71) electrically connected to the second terminal, and a heat-sensitive member (8) arranged so as to deform above a predetermined temperature, wherein, above a predetermined temperature, the deformation of the heat-sensitive member (8) actuates a connection means (72) of the thermal protection device in order to electrically connect the first conductor to a second conductor of the electric circuit having a different electric potential than that of the second terminal.

14 Claims, 4 Drawing Sheets

(58) Field of Classification Search
USPC .............................................. 310/68 C, 239
See application file for complete search history.

(56) References Cited

U.S. PATENT DOCUMENTS

| | | | | |
|---|---|---|---|---|
| 5,294,851 A * | 3/1994 | Tajima | ................... | H02K 5/145 |
| | | | | 310/40 MM |
| 5,294,852 A * | 3/1994 | Straker | .............. | H02K 11/0047 |
| | | | | 310/239 |
| 6,037,685 A * | 3/2000 | Berfield | ................ | H02K 5/148 |
| | | | | 310/242 |
| 6,188,154 B1 * | 2/2001 | Luedtke | ............... | H01H 37/767 |
| | | | | 310/239 |
| 6,518,686 B2 * | 2/2003 | Bailey | ................. | H02K 5/1672 |
| | | | | 310/238 |
| 6,787,962 B2 * | 9/2004 | Yagi | ....................... | H02K 23/66 |
| | | | | 310/239 |
| 7,218,027 B2 * | 5/2007 | Neidhart | ............... | A63H 29/22 |
| | | | | 310/239 |
| 2005/0057110 A1 * | 3/2005 | Wolfe | ................... | H02K 5/148 |
| | | | | 310/68 R |
| 2007/0108864 A1 * | 5/2007 | Suzuki | ................ | H01R 39/381 |
| | | | | 310/239 |

* cited by examiner

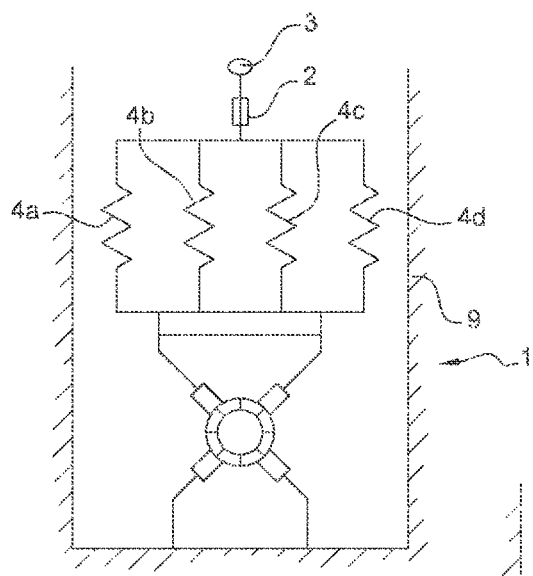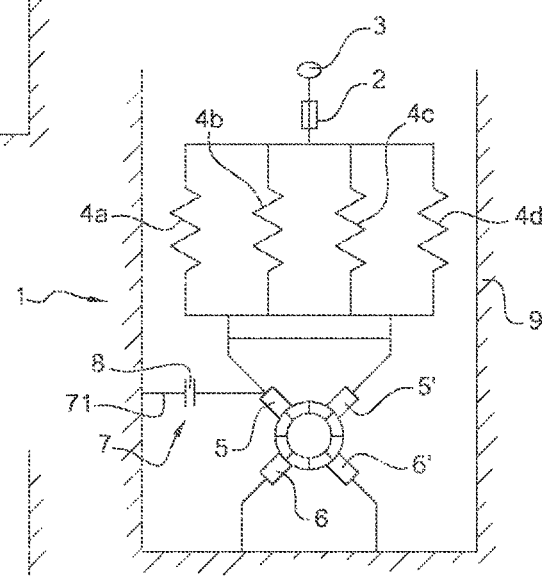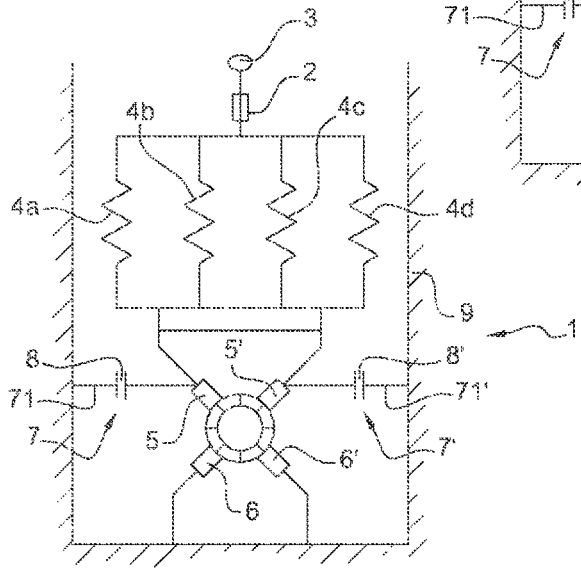

0
SYSTEM FOR PROTECTING AGAINST HEATING FOR A ROTATING ELECTRIC MACHINE, IN PARTICULAR A STARTER

CROSS-REFERENCE TO RELATED APPLICATIONS AND CLAIM TO PRIORITY

This application is a national stage application of International Application No. PCT/FR2012/051482 filed Jun. 27, 2012, which claims priority to French Patent Application No. 1155910 filed Jun. 30, 2011, of which the disclosures are incorporated herein by reference and to which priority is claimed.

FIELD OF THE INVENTION

The present invention relates to a system for protection against heating for a rotary electrical machine, in particular a starter.

BACKGROUND OF THE INVENTION

Rotary electrical machines such as starters each comprise one or more electric fuse(s) or one or more circuit breaker(s) which are known hereinafter as a means for protection against excess current, which, in the case of a maximum predetermined current, respectively blow or open their contact in order to cut the electric supply of the rotary electrical machine after a certain time (time necessary respectively for the blowing or triggering).

The means for protection against excess currents can also be connected electrically upstream from the rotary electrical machine.

These means for protection against excess currents make it possible to prevent damage to the rotary electrical machine or its environment caused by the heat produced by the excess current. For example, in the case of a starter, the heat produced by a starter with excess current gives rise to heat which can damage the equipment in the engine compartment of the vehicle.

An example of an electrical machine 1 comprising a fuse 2 is represented in FIG. 1. The fuse 2 is fitted in series between a supply terminal 3 of the electrical machine 1 and the windings 4a, 4b, 4c, 4d of the stator of the rotary electrical machine 1.

In an electrical machine with direct current, it is known that the current increases strongly if the rotor is blocked in rotation. This increase in the current can reach the maximum predetermined current of the means for protection, which is equivalent to an excess current. In certain cases of normal functioning of a rotary electrical machine, the rotor can be blocked in rotation for several seconds (known as the blockage time hereinafter). This is the case in particular for the rotary electrical machines in starters, during normal use for starting of a thermal engine.

Consequently, the means for protection must be calibrated such that it cannot blow or open its contact for a predetermined time, whilst the current which passes through it is equal to, or greater than, the maximum predetermined current.

The predetermined time is determined by persons skilled in the art in a conventional manner according to the blockage time of the rotary electrical machine in normal use. For example, persons skilled in the art in the field of starters determine the predetermined time in a conventional manner according to the type of thermal engine to be started, the type of starter, and the most unfavourable environment selected by the vehicle manufacturers for starting of the thermal engine.

For example, for a starter, the calibration of the means for protection against excess currents, in this case the fuse, is selected such that the fuse blows when the rotor is blocked beyond the predetermined time necessary for starting of the thermal engine.

In other words, for a starter, the calibration of the means for protection against excess currents is selected firstly to blow or open its contact(s) when the time of a current passing through the rotary electrical machine, with its rotor blocked in rotation, which is equal to or greater than the maximum predetermined current, is longer than the predetermined time necessary for the starting of the thermal engine, but it must also not blow or open its contact(s) during the predetermined time when the current passing through it is equal to the current passing through the rotary electrical machine which has its rotor blocked in rotation.

However, when the machine is functioning unloaded (i.e. without a load or with a very low load), the unloaded speed of rotation of the rotor gives rise to heating of the electrical machine 1, caused in particular by the mechanical friction between the brushes and the collector. A low load means 0 to 25% of the of the nominal load. This heating increases the temperature of the environment in which the rotary electrical machine 1 is situated, and can damage the equipment or parts situated in this environment. For example, in the case of a starter connected to a thermal engine of a vehicle, which are situated in an engine compartment, when the starter rotates unloaded, i.e. when the thermal engine is disengaged from the rotor of the starter, which is the case in particular in an overspeed phase (when the pinion of the starter, driven by the thermal engine, rotates faster than the speed of the drive shaft which is rotated by the rotor of the starter), the temperature of the starter can damage the equipment which is situated in the engine compartment of the vehicle, in particular electronic components which are present increasingly in vehicles.

When the electrical machine is functioning unloaded, the current which passes through its fuse, and is also known as the no-load current (approximately 10% of the blockage current), as well as the increase in the temperature surrounding the means for protection against excess current, in this case the fuse 2, can be too low for the fuse 2 to be able to blow, even in the case of prolonged use of the starter in unloaded use.

A solution would thus consist of selecting a fuse, the calibre of which is selected such that it can blow both when the time of a no-load current passing through the fuse exceeds a first predetermined time, and when the time of a current passing through the rotary electrical machine with its rotor blocked exceeds a second predetermined time (the predetermined time for the blockage state), without the fuse blowing in the aforementioned cases. There are fuses with a volume which is far greater than a fuse of standard size (Le, a fuse with calibration selected in order to comply only with one of the two cases (blockage or unloaded)). This excessive volume can generate considerable transformation in the electrical machine or in the environment in which it is situated; for example, for a starter, the engine compartment of a vehicle.

In addition, for certain calibres required, which in particular is the case for certain vehicle starters, at present there is no fuse with a calibre which can comply with these two cases (case of blockage and unloaded).

SUMMARY OF THE INVENTION

The object of the present invention is thus to provide a rotary electrical machine comprising a system which makes it possible to cut off the electric supply of the rotary electrical machine in the two aforementioned cases (in the cases of blockage and unloaded), whilst being less voluminous than the volume of a fuse which makes it possible to cut off the current in both cases.

More particularly, the object of the invention is to provide a rotary electrical machine comprising at least a first and a second supply terminal, and an electric circuit connected to these two terminals, the electric circuit comprising at least one resistive unit such as an excitation coil.

The rotary electrical machine additionally comprises a thermal protection device, which is provided in the electrical machine, comprising a first electric conductor which is connected electrically to the second terminal, a heat-sensitive unit which has characteristics such as to be deformed beyond a predetermined temperature, and is arranged in the electrical machine in order to be deformed beyond a predetermined temperature;

a mobile means for connection, which is arranged such as to be able to shunt the excitation coil by connecting the first conductor to a second conductor fitted upstream from the excitation coil in order to form an electric circuit which is at least 30 times less resistant than the resistor of the excitation coil, in parallel with the latter. The heat-sensitive unit is designed such that its deformation activates mechanically the means for connection of the thermal protection device, such that it connects the first conductor electrically to a second conductor of the electric circuit which is connected directly electrically to the input of the excitation coil, the second conductor having an electric potential which is different from that of the second terminal before activation of the means for connection, and such that, when the means for connection is deactivated, the protection device is disconnected electrically from the electric circuit.

The heat-sensitive unit takes a certain amount of time to be deformed at the predetermined temperature. The predetermined temperature preferably corresponds to the temperature in the interior of the machine which can damage the equipment/units which are in the same environment of the rotary electrical machine. However, it is possible also to select a predetermined temperature of 1 or more degrees Celsius below the temperature which can give rise to deterioration, but which is high enough above a normal temperature in extreme conditions to prevent the heat-sensitive unit from being deformed.

The fact of arranging a heat-sensitive unit in the rotary electrical machine which makes it possible to connect the first terminal electrically to a resistive unit of the electric circuit comprising at least the excitation coil when a predetermined temperature is reached, makes it possible to have an electric circuit with a lower impedance that at of the machine in normal functioning.

In addition, the thermal protection device does not comprise an electric unit which consumes current when the means for connection is deactivated.

In addition, the fact of using the excitation coil as a resistive unit makes it possible firstly to avoid a short-circuit, and secondly to be without a resistive unit which requires space in the electrical machine.

In fact, the resistive unit of the rotor is shunted, thus giving rise to a decrease of the impedance of the rotary electrical machine. Thus, the current which passes through the machine (more than 50% of which passes via the first and second conductor) increases to a predetermined current (I=U/R). Thus, it is possible, for example when the machine is running unloaded and reaches a predetermined temperature, to increase the current until it is ensured that a protection device, such as a fuse or a circuit breaker which is designed to disconnect the rotary electrical machine electrically in the event of excess current, can cut off the supply of the electrical machine within a predetermined time.

The calibre of a fuse or a circuit breaker is a specific current value for a specific time in which the fuse will blow or will open its contact(s). A means for protection against excess current therefore takes a predetermined time to disconnect the electric circuit electrically from the rotary electrical machine for a specific current passing through it which is equal to, or greater than, a so-called nominal current value (value of the minimum current for which the fuse will blow). The blowing time varies according to the ambient temperature.

In the case of a temperature which exceeds a predetermined temperature which can correspond to an abnormality, the protection device makes it possible to reduce the impedance of the rotary electrical machine, such that the current value which passes through the rotary electrical machine is high enough for the means for protection against excess currents to cut off the supply of the rotary electrical machine, For example, the value of the impedance of the machine, when the protection device is activated, is determined such that the value of the current which passes through the machine must at least reach the value of the minimum current for which the fuse or the circuit breaker respectively will blow or be triggered, in general, the resistance of the excitation coil is low enough to trigger the means for protection.

Thus, the thermal protection device according to the invention allows the electrical protection device of the electrical machine to disconnect this machine in both cases of functioning (in the case of functioning unloaded which lasts longer than a predetermined time, and in the case of a rotor blockage which lasts longer than a second predetermined time).

For this purpose, the present invention proposes a rotary electrical machine comprising:
  at least a first terminal and a second terminal and an electric circuit connected to these two terminals, the electric circuit comprising an excitation coil;
  a thermal protection device which is provided in the electrical machine comprising:
    a first electric conductor which is connected electrically to the second terminal;
    a heat-sensitive unit which is disconnected electrically from the electric circuit, and is arranged in the electrical machine in order to be deformed beyond a predetermined temperature,
  wherein, beyond a predetermined temperature, the deformation of the heat-sensitive unit activates mechanically a means for connection of the thermal protection device, such that it connects the first electric conductor electrically to a second conductor of the electric circuit which is connected directly electrically upstream from the excitation coil, the second conductor having an electric potential which is different from that of the second terminal before the activation of the activation means.

Connecting two units directly electrically means that there is no electric unit which is connected electrically between the two units other than a conductor.

Conductor means an electric unit with low resistance which serves the purpose of connecting an electric unit to another electric unit, for example a conductor can be such as a cable, an electric contact (switch), brushes, or a collector.

Thus, as previously explained, the heat-sensitive unit activates the means for connection, thus forming an electric circuit which "shunts" a resistive unit of the electric circuit of the machine. Consequently, the equivalent resistance of the machine decreases, and therefore the current which passes through it increases, forming an excess current, until the means for protection against excess currents is triggered (for example a fuse which blows or a circuit breaker which opens its contact(s)) and cuts off the supply of the rotary electrical machine. This therefore solves the problem, by making it possible to cut off the electrical supply of the rotary electrical machine in both the aforementioned cases. The second protection device can have a small size, and can be placed in the rotary electrical machine without increasing the size of the latter. Consequently, the problem is solved without modifying the size of the rotary electrical machine.

In addition, the thermal protection device is without an electric unit which consumes current during normal functioning of the machine. This is due in particular to the fact that the heat-sensitive unit is autonomous, in order not to consume current. In fact, the heat-sensitive unit is arranged in an area of the machine, the temperature of which varies by several degrees according to the heat generated by the mechanical units.

According to preferred embodiments, the machine comprises one or a plurality of the following characteristics:

The first conductor of the protection device is a part of the frame of the machine.

The means for connection can comprise an electrically conductive part which is mobile between a blocked position and a short circuit position, in which the mobile conductive part is arranged such that, in the blocked position, it is electrically isolated from the first conductor or from the unit of the electric circuit which has an electric potential different from that of the second terminal, and in the short-circuit position, it connects the first terminal electrically to the first conductor, and wherein the heat-sensitive unit is designed to retain the mobile conductive part in the blocked position and when it is deformed it is designed to release the mobile conductive part from the blocked position, such that the latter is free to be displaced from the blocked position to the short-circuit position.

The machine can additionally comprise a means for displacement, in order to make it possible to displace the mobile conductive part from the blocked position to the short-circuit position.

According to another embodiment, the means for connection can be displaced from the blocked position to the short-circuit position, when it is released by gravitation.

The circuit can comprise positive brushes, and wherein the heat-sensitive unit is designed such that, when it is deformed, it makes it possible to connect one of the brushes electrically to the first conductor.

The machine can additionally comprise an electrically conductive brush holder with its brush, with the heat-sensitive unit making it possible, by means of the means for connection, to connect the first conductor and the brush holder electrically.

The mobile conductive part and the brush holder can be designed to co-operate by forming a slight connection between them.

The machine can additionally comprise a rotor shall, and inductive coil and a collector, a positive brush which is connected electrically to the first terminal, and a spring, between the brush and the first conductor, in order to thrust the brush towards the connector, also forming the means for displacement of the mobile conductive part, and wherein the heat-sensitive unit is displaced, when it has reached the predetermined temperature, in order to allow the spring to displace the mobile conductive part from an initial position to a final position in contact with the first conductor.

The protection device can additionally comprise an isolation unit fitted between the mobile conductive part and the spring.

The cage of the brush can be connected electrically to the first terminal by means of the mobile conductive part in the blocked position.

The means for connection can be the heat-sensitive unit.

The rotary electrical machine can also be a direct current rotary electrical machine.

The machine can also comprise a second protection system.

The second conductor can be a positive supply brush is connected electrically to the mobile conductive part, and the first electric conductor is connected to the earth.

The first conductor can be connected to the second terminal by means of a resistive unit.

The electric circuit can also comprise windings in order to form the stator. The windings can be electrically upstream or downstream from the second conductor, or they can be parallel with the second conductor.

In the case of downstream fitting, the first conductor is connected electrically to the second terminal by means of the windings of the stator, in order to prevent an outright short-circuit.

The rotary electrical machine can also comprise magnets in order to form the stator. In this case, the second conductor is connected electrically to the first terminal of the rotary electrical machine, and the protection device can comprise a resistor which is supplied electrically between the first and second conductor, when the means for connection is activated.

The rotary electrical machine can also comprise a means for protection against excess currents. This means for protection against excess currents can be a fuse or a circuit breaker. It can be fitted electrically upstream or downstream from the excitation coil. In the case of a rotary electrical machine comprising windings in order to form the stator, the means for protection can be fitted electrically upstream or downstream from the excitation coil.

Fitted electrically upstream from an electric unit means fitted between the first terminal and the electric unit.

Fitted electrically downstream from an electric unit means fitted between the second the a and the electric unit.

The invention also relates to a machine which additionally comprises the fact that the means for connection and the first and second conductor are arranged in order to form a circuit in parallel with the excitation coil, when the means for connection is activated, and at least one of the first or second conductors is connected directly electrically to the excitation coil.

The machine can additionally comprise the fact that the heat-sensitive unit is arranged in e machine in order to be heated mainly by the mechanical friction of the machine and the resistivity of the excitation coil.

The invention also relates to a starter for a motor vehicle, comprising a rotary electrical machine as previously described.

The invention also relates to a system for protection of an electrical machine against overheating, comprising a rotary electrical machine as previously described, and an electric supply means comprising a first terminal and a second terminal which are connected electrically respectively to the first and second terminals of the rotary electrical machine, and a fuse upstream from the electrical machine fitted between the first terminal of the electric supply means and the first electric terminal of the rotary electrical machine, in order to disconnect an electric terminal of the electric supply means of the rotary electrical machine, when the current which passes through the fuse exceeds a predetermined value for a predetermined time.

Connecting two electric units electrically means connecting a terminal of each electric unit electrically by means of an electrically conductive unit such as a cable or piece of metal.

Difference of potential V means a difference of potential of more than 10% of the difference of potential at the terminals of the machine.

Resistive unit means a unit in the rotary electrical machine such that at its terminals there is a difference of potential V when the rotary electrical machine is supplied electrically.

BRIEF DESCRIPTION OF THE DRAWINGS

Other characteristics and advantages of the invention will become apparent from reading the following description of a preferred embodiment of the invention, provided by way of example, and with reference to the appended drawing.

FIG. 1 represents a skeleton diagram of a protection system according to the prior art.

FIG. 2 represents a skeleton diagram of a first embodiment of a protection system according to the invention.

FIG. 3 represents a skeleton diagram according to a second embodiment of a protection system.

DETAILED DESCRIPTION

Figure 4:
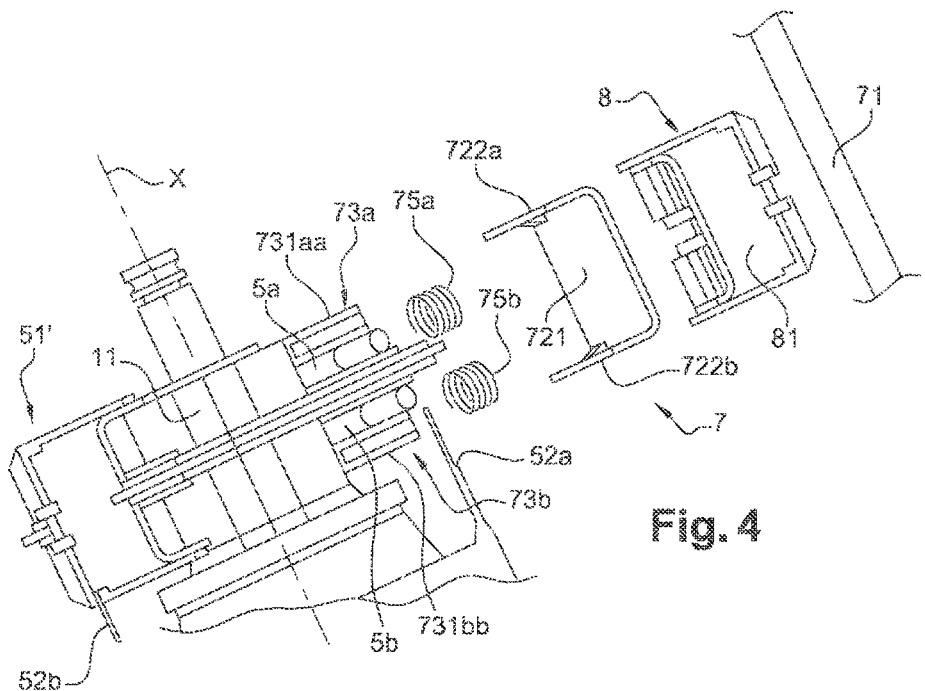
FIG. 4 represents an exploded view of a first embodiment of a protection device of the protection system.

It will be appreciated that the present invention is not limited to the examples and embodiments described and represented, but can incorporate numerous variants which are accessible to persons skilled in the art.

FIG. 2 represents a skeleton diagram of a first embodiment of the protection system according to the invention. The protection system comprises a rotary electrical machine which is represented schematically in a simplified form. In this case, the rotary electrical machine is a direct current machine, The machine is firstly connected electrically by means of a means for protection against excess currents, in this case a fuse 2, to a positive terminal 3 (for example of a battery, not represented), and secondly to a second terminal which forms the earth of the machine, corresponding to the frame 9 of the direct current electrical machine. Frame 9 means the front and rear bearing flange of a rotary electrical machine The frame 9 can also comprise a case containing the stator of the rotary electrical machine. The stator can also form part of the frame 9.

The rotary electrical machine 1 comprises a stator and a rotor. The rotary electrical machine 1 comprises an electric circuit which is connected to these two terminals. The circuit comprises an excitation coil, which in this case is fitted on the rotor and windings 4a, 4b, 4c, 4d, in this case four windings which are represented in FIG. 2 fitted in the stator. The excitation coil is supplied electrically by means of at least one positive brush 5 and at least one negative brush 6. In this case, there are two positive brushes 5, 5' and two negative brushes 6, 6'. The two brushes 6, 6' are connected to the earth of the rotary electrical machine 1, in this case by means of the frame 9 of the rotary electrical machine 1. The frame 9 is connected to a negative terminal of a supply, for example a battery, not represented.

The two positive and/or negative brushes can be fitted axially, i.e. according to the axis X of the rotary electrical machine 1, or distributed angularly, preferably regularly, around the collector of the rotary electrical machine 1.

The fuse 2 is fitted between the positive terminal 3 and the windings 4a, 4b, 4c, 4d. The windings 4a, 4b, 4c, 4d are fitted in parallel with one another. The assembly of the windings 4a, 4b. 4c, 4d is fitted between the fuse 2 and the two positive brushes 5, 5'. The excitation coil, not represented, is thus fitted in series with the assembly of the windings 4a, 4b, 4c, 4d. The machine, the windings, and the excitation coil can also be fitted otherwise. Other examples of fitting are described hereinafter in the description.

The rotary electrical machine 1 additionally comprises a thermal protection device 7. The thermal protection device 7 comprises a first electric conductor 71 which is connected electrically to the second terminal, and in this case the first conductor 71 is connected electrically to the earth of the frame 9. The thermal protection device 7 also comprises a heat-sensitive unit 8 which is designed to be deformed beyond a predetermined temperature. The heat-sensitive unit is provided in particular in an area of the machine where the heat varies mainly according to the heat created by the mechanical friction.

The thermal protection device is also connected to a second conductor which is connected directly electrically to the excitation coil by means of a brush.

The heat-sensitive unit 8 is designed to activate mechanically, by means of its deformation beyond a predetermined temperature, a means for connection which connects the first conductor 71 electrically to the electric circuit. The means for connection can be a conductive mobile part, a contact, or a strip which makes it possible to connect the first conductor 71 to a unit (known hereinafter as the second conductor) of the electric circuit, with potential other than that of the first conductor 71. In other words, there is a difference of potential V between the first conductor 71 and the second conductor, when the heat-sensitive unit has not been deformed and there is no longer any difference of potential V when the heat-sensitive unit has activated the means for connection.

In this case, the thermal protection device 7 makes it possible to form an electric circuit in parallel with the excitation coil when the heat-sensitive unit 8 is deformed. In particular, the thermal protection device 7 connects the first conductor by means of the means for connection, to one of the two positive brushes 5, 5', in this case the brush 5. The electrical connection formed by means of the means for connection, of the first conductor 71 to the positive brush 5, has an impedance which is sufficiently low for the value of the impedance of the rotary electrical machine 1 to be sufficiently low for the current which passes through the rotary electrical machine 1 to make it possible to activate the means for protection against excess currents before a predetermined time. Thus, the electrical connection which forms an electric circuit formed by the thermal protection device 7, when the heat-sensitive unit 8 has been deformed, has an impedance selected such that the equivalent resistance of the rotary electrical machine 1 decreases sufficiently for the current which passes through the rotary electrical machine 1 to blow the fuse 2 in a required period of time T.

The predetermined temperature is selected such that the heat transmitted by the rotary electrical machine 1 in the environment does not exceed a temperature threshold, in order to prevent the environment in which the rotary electrical machine 1 is located from reaching a temperature which generates malfunctions in the units, products, and devices (known hereinafter as the surrounding parts) around the rotary electrical machine 1.

The current which passes through the rotary electrical machine 1 can for example be equal to, or greater than, the excess current, in the case in which the rotor of the rotary electrical machine 1 is blocked, in order to disconnect the rotary electrical machine 1 rapidly.

The heat-sensitive unit 8 which is arranged in the rotary electrical machine 1 has characteristics (materials, thickness, form, etc.) such that the deformation time of the heat-sensitive unit 8, when its temperature reaches the predetermined temperature, is in a time range which allows the fuse 2 to blow within a satisfactory time range, no as not to damage the surrounding parts. In other words, the heat-sensitive unit 8 is selected such that its deformation takes place in quite a short period of time such that the total time (melting time of the heat-sensitive unit 8 plus the time for blowing of the fuse 2) is within a predetermined time range, so as not to damage the surrounding parts.

Two embodiments of the protection device 7 will be described in greater detail hereinafter in the description.

According to a second embodiment, which is represented schematically in FIG. 3, of a protection device according to the invention, the system comprises, in addition to the protection system previously described, a second thermal protection device 7'. This second thermal protection device 7' is connected between the second positive brush 5' and the earth. It can be identical to the thermal protection device 7 described in the first embodiment of a protection system according to the invention.

This makes it possible to obtain protection redundancy, in order to decrease the risks of excessive heating damaging the surrounding parts, caused by a functioning fault of the thermal protection device 7 described in the first embodiment of the safety system.

According to other embodiments, not represented, the thermal protection device(s) 7 is/are provided upstream from the windings. In other words, the thermal protection device 7 is designed to connect a supply terminal 3, in this case the positive terminal, to the other supply terminal, in this case the earth.

According to another embodiment, not represented, the windings 4a, 4b, 4c, 4d and the excitation coil are not fitted in series, but in parallel.

According to another example, not represented, the windings 4a, 4b, 4c, 4d can be replaced by magnets. In this case, the thermal protection device 7 is placed such as to put the earth into contact with a conductor which is situated electrically between the excitation coil and the positive terminal.

According to another example, not represented, the rotary electrical machine 1 is a three-phase rotary electrical machine 1. In this case, the system comprises at least one thermal protection device 7 which is designed to connect a terminal of the windings or the neutral respectively either to the earth or another phase, or a phase. In the case of a three-phase rotary electrical machine 1 with a rotor comprising an excitation coil, the thermal protection device 7 can be designed to connect the two terminals of the excitation coil electrically.

A detailed description will now be provided of a first embodiment of the thermal protection device 7.

Figure 5:
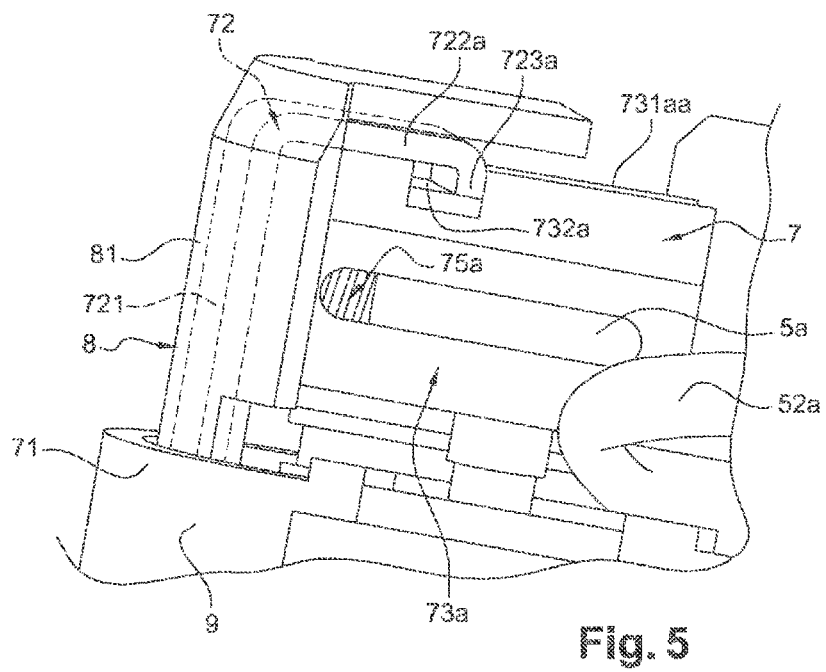
FIG. 5 represents a perspective view of the first embodiment of the protection device and part of the rotor of the rotary electrical machine.

FIG. 4 represents in exploded view the first embodiment of the thermal protection device 7 and a part of the rotor. FIG. 5 represents a part of this thermal protection device 7 assembled on the rotor.

In this example, the rotary electrical machine 1 is a direct current machine, and comprises a collector 11 and an excitation coil (not represented), fitted on the rotor of the rotary electrical machine 1.

According to the axis X represented in FIG. 4, the front and rear of the rotor of the rotary electrical machine 1 mean the rear which is closest to the rear bearing and the front which is closest to the front bearing, in the knowledge that the front bearing is closer to the collector of the rotor than to the excitation coil.

Radial cans a surface, a side or a rim which is on a plane perpendicular to the axis X of the rotor.

Axial means a surface, a side or a rim which is on a plane parallel to the axis X of the rotor.

In the example represented in FIG. 4, the rotary electrical machine 1 comprises a first and second positive brush-holder assembly, respectively 51, 51', each comprising a front 73a and rear 73b brush holder each accommodating respectively a positive front 5a and rear 5b brush, which is translated inside the corresponding brush holder. Parts of the first positive brush-holder assembly and the parts of the protection device 7 are represented in exploded view in FIG. 4, such as the brush holders 73a, 73b, and positive brushes 5a, 5b. The parts of the second positive brush-holder assembly 51' are not represented. The first assembly 51 and the protection device 7 are represented assembled in FIG. 5. The negative brushes and the two negative brush holders are not represented in FIGS. 4 and 5. The brushes 5a, 5b of the first and second brush-holder assembly 51, 51' are each connected electrically to the windings 4a, 4b, 4c, 4d (not represented in FIGS. 4 and 5) by means of a cable 52a, 52b.

A detailed description will now be provided only of the first brush-holder assembly 51. The second brush-holder assembly 51' is preferably identical and this makes it possible to have the minimum number of part references to be provided. The front 73a and rear 73b brush holders are aligned axially on the collector 11. The thermal protection device 7 is fitted between the brush-holder assembly 51 and the frame 9 of the rotary electrical machine 1. In this embodiment the brush-holder assembly 51 can be insulating or conductive.

The first conductor 71 of the thermal protection device 7 is a part of the frame 9 of the rotary electrical machine 1. This makes it possible to reduce the number of parts in the rotary electrical machine 1.

In this embodiment, the means for connection of the thermal protection device 7 comprises an electrically conductive unit, known hereinafter as the mobile conductive part 72. The mobile conductive part 72 is mobile from a blocked position to a short-circuit position when the heat-sensitive unit 8 has been deformed. The mobile conductive part 72 can be displaced from the blocked position to a short-circuit position by gravity or by a displacement means. In the short-circuit position, the mobile conductive part 72 connects the first conductor electrically to a unit of the electric circuit of the machine with a potential other than that of the first conductor. In this case, the mobile conductive part 72 is fitted against the brush holders 73a, 73b, and is connected electrically to the same potential as that of the positive brush holders or brushes. Each brush is compressed against the collector 11, in order to establish good electrical contact by means of a spring 75a, 75b. Each spring 75a, 75b is compressed between the corresponding brush and the mobile conductive part 72. The springs 75a, 75b are fitted inside the brush holders 73a, 73b.

The heat-sensitive unit 8 of the thermal protection device 7 comprises a plate 81 situated between a plate 721 of the mobile conductive part 72 and the first conductor 71 (a part of the frame 9). The springs 75a, 75b thus each compress firstly their corresponding brush against the collector 11, and secondly the mobile conductive part 72 against the plate 81 of the heat-sensitive unit 8. The heat-sensitive unit 8 is represented in a transparent manner in FIG. 5.

The thickness and the material of the plate 81 of the heat-sensitive unit 8 are selected such that the plate 81 melts when it reaches the predetermined temperature. When this plate 81 of the heat-sensitive unit 8 melts, the springs 75a, 75b displace the mobile conductive part 72.

The springs 75a, 75b thus also form part of the thermal protection device 7. In fact, the springs are a means for displacement of the mobile conductive part 72 until it is in contact with the first conductor 71. This embodiment of the thermal protection device 7 has the advantage of using parts which are ready-made and placed in the rotary electrical machine 1, and have a second function. There is therefore a saving in space in comparison with a similar thermal protection device 7 to which a spring would be added in order to displace the heat-sensitive unit 8.

When the mobile conductive part 72 is in contact with the first conductor 71, it is also in electrical contact with the brush, in this case the brushes 5a and 5b, for example by means of the spring 75a, 75b or the electrically conductive brush holder 73a, 73b, or another electric conductor such as a cable, thus creating an electric circuit between the positive brush and the earth. Thus, the equivalent resistance of the rotary electrical machine 1 is reduced. Consequently, the current which passes through the rotary electrical machine 1 also passes via the fuse 2 which is calibrated to blow in a predetermined time.

According to another embodiment, not represented, of the thermal protection device 7 previously described, the thermal protection device comprises a single spring. For example, there are not two adjacent brush holders, but a single one.

A description will now be provided of an example of assembly of the embodiment of the thermal protection device 7 assembled in the rotary electrical machine 1.

FIG. 5 represents only the front brush holder 73a. The front 73a and rear 73b brush holders each comprise two radial and lateral walls, respectively outer radial lateral front 731aa and rear 731ab, 731bb. The front radial lateral wall of the rear brush holder is not represented. The front 73a and rear 73b brush holders each comprise respectively on the front radial wall 731aa and on the rear radial wall 731bb of the outer side of the walls of the brush holder, a front 732a and rear groove which has an axial depth and radial width, and extends perpendicularly to the axis X. The rear groove on the rear radial wall 731bb is not represented, Only the front groove 732a on the front wall 731aa can be seen in FIG. 5.

The mobile conductive part 72 comprises front and rear radial lateral rims 722a, 722b, which extend from two sides of the plate 721 of the mobile conductive part 72. The front and rear radial lateral rims 722a, 722b border and match the form of the outer side, respectively of the front radial wall 731aa of the front brush holder 73a, and of the rear outer radial wall 731bb of the rear brush holder 73b.

The front and rear rims 722a, 722b comprise respectively front 723a and rear lugs, fitted respectively inside front 732a and rear grooves, respectively of the front 731aa and rear 731bb walls. Only the front lug 723a on the front rim 722a is represented, and is shown in FIG. 5.

The difference between the radial width of the front 732a and rear lugs, and respectively the radial width of the front 723a and rear lugs, is at least greater than the distance between the mobile conductive part 72 and the first conductor 71, These front 723a and rear lugs, and the front 723a and rear grooves make it possible to guide the displacement of the mobile conductive part 72 along the brush-holder assembly.

In the ease of a brush holder 73a, 73b which is electrically conductive, the front 732a and rear lugs and the front 732a and rear grooves can be designed such that, when the heat-sensitive unit 8 has melted, the mobile conductive part 72 is in contact with the brush holder 73a, 73b.

In the case of a brush holder 73a, 73b which is not electrically conductive, the spring of the brush 75a, 75b is selected so as to ensure the electrical contact between the mobile conductive part 72 and the brush.

According to another example, not represented, the thermal protection device 7 can additionally comprise a means for electrical connection which connects the mobile conductive part 72 to one or more front 5a and rear 5b brush(es), or to the cable 52a, thus connecting the front 5a and rear 5b brushes electrically to the windings 4a, 4b, 4c, 4d.

Figure 6:
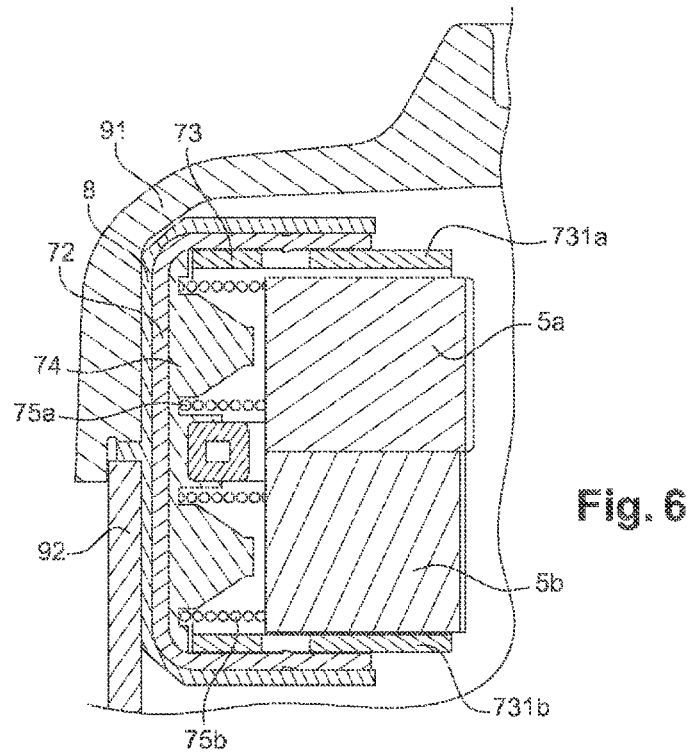
FIG. 6 represents a view in cross-section of a second embodiment fitted on the electrical machine.
Figure 9:
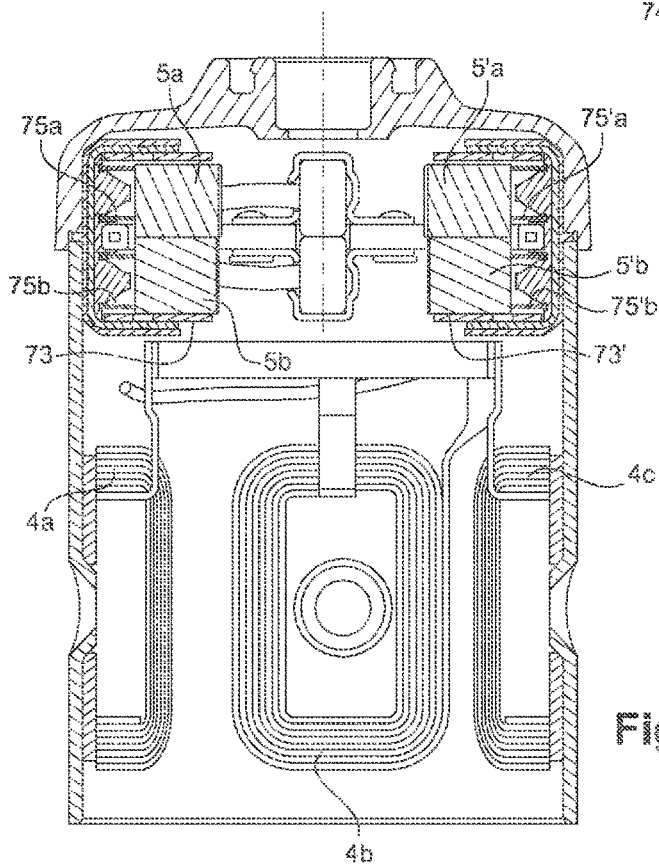
FIG. 9 represents a view in cross-section of an electrical machine of the second embodiment, comprising two thermal protection devices according to the second embodiment.

FIG. 6 represents a view in cross-section of another embodiment of the thermal protection device 7 and another embodiment of the brush holder. In this embodiment, the rotary electrical machine 1 comprises two positive brush holders 73, 73', each supporting a front brush 5a and a rear brush 5b. The brush holder 73' is represented in FIG. 9. The rotary electrical machine 1 could comprise only a single brush holder 73, and the or each brush holder could support a single brush. In this embodiment, the brush holders 73, 73' are electrically conductive. The thermal protection device 7 of the thermal protection device 7 represented in FIGS. 4 and 5 also comprises an electrical isolation unit 74, which is situated between the springs 75a, 75b and the mobile conductive part 72. This electrical isolation unit 74 makes it possible to prevent the current passing from the brushes 5a, 5b to the mobile conductive part 72 by means of the springs 75a, 75b. This has the advantage of not selecting springs 75a, 75b which make it possible to withstand the electrical constraints, but only to ensure firstly the function of a means for placing the mobile conductive part 72 against the first conductor 71 when the heat-sensitive unit 8 has been deformed, and secondly the function of support of the brush 5a, 5b against the collector 11. In this case, in this embodiment, the first conductor is formed both by a part of the front bearing 91 and a part of the stator 92.

The electrical isolation unit 74 comprises an isolating plate and also two, front 742 and rear 743 projections, each designed to be inside the spring respectively 75a, 75b of the coil holder 73.[1] This makes it possible to retain the springs when they relax.

[1] Translator's note: Presumably "porte bobine 73" ("coil holder 73") here is a typing mistake, since elsewhere the reference 73 indicates the "porte-balai"="brush holder".

In this embodiment, the front 722a and rear 722b lateral rims of the mobile conductive part 72 comprise a convex undulating form towards the radial walls 731a and 731b of the brush holder 73. The convex form of each lateral rim 722a, 722b forms a means for resilient return which makes it possible to ensure the contact between the lateral rims 722a, 722b and the radial walls 731a, 731b of the brush holder 73, in order to ensure the electrical contact between them.

Figure 7:
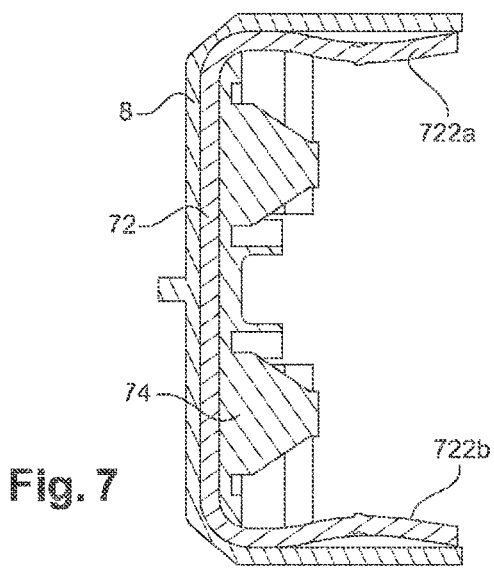
FIG. 7 represents a view in cross-section of a part of the second embodiment of the protection device.

FIG. 7 represents a view in cross-section of a part of the thermal protection device 7, in this case the heat-sensitive unit 8, the mobile conductive part 72, and the isolating plate 74.

Figure 8:
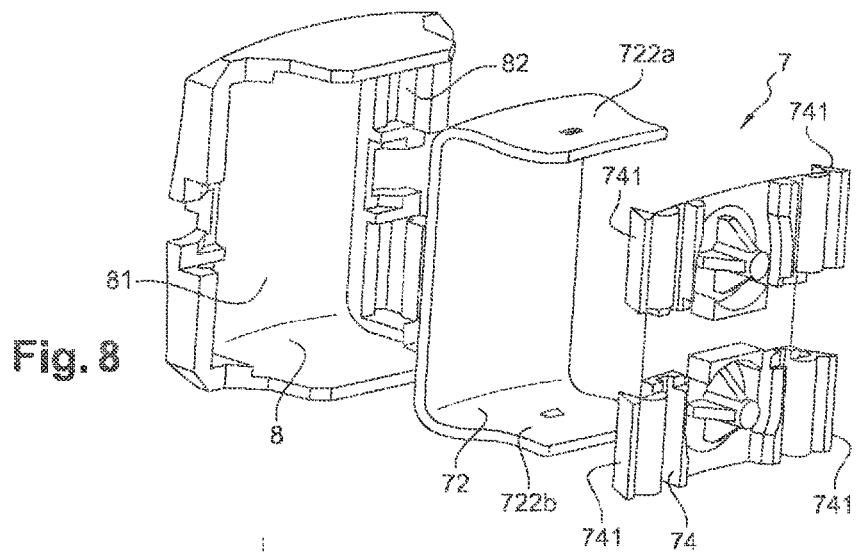
FIG. 8 represents an exploded view of a part of the second embodiment of the protection device.

FIG. 8 represents an exploded view of this part of the thermal protection device 7. According to an embodiment of this protection device, the isolating plate 74 comprises attachment means which are designed to be secured to the heat-sensitive unit 8. In this case, the heat-sensitive unit 8 comprises grooves 82, two of which can be seen in FIG. 8, and which are designed to receive the means for attachment of the isolating plate 74. The means for attachment are snap-in units 741 which fit into the grooves 82.

These means for attachment of the heat-sensitive unit 8 make it possible to retain the assembly of the heat-sensitive unit 8, the mobile conductive part 72 and the isolating plate 74. This makes it possible to assembly this assembly before it is fitted in the rotary electrical machine 1. This facilitates the assembly and reduces the assembly time of these parts on the brush holder.

FIG. 9 represents a view in cross-section of a rotary electrical machine 1 according to the axis X, without its rotor, comprising two thermal protection devices 7.

According to another embodiment of the thermal protection device 7, the brush holder is not conductive. In this case, the mobile conductive part is connected electrically to a conductor which connects the windings 4a, 4b, 4c, 4d to the positive brushes 5, for example by means of a cable.

In the case of a rotary electrical machine 1 for a starter, the heat-sensitive unit 8 is designed to be capable of being deformed when the temperature reaches a temperature in a starter which is running idle for a duration of functioning beyond that of normal functioning.

The invention claimed is:

1. A starter for a motor vehicle comprising:
   a rotary electrical machine including a rotor shaft, an inductive coil and a collector (11), and at least a first terminal and a second terminal and an electric circuit connected to these two terminals, the electric circuit comprising an excitation coil in the rotor;
   a thermal protection device, (7) which is provided in the electrical machine, comprising: a first electric conductor (71) which is connected electrically to the second terminal and which first electrical conductor forms a part of the frame of rotary electrical machine; a heat-sensitive unit (8) which is disconnected electrically from the electric circuit, and is arranged in the electrical machine in order to be deformed beyond a predetermined temperature, wherein, beyond said predetermined temperature, the deformation of the heat-sensitive unit (8) activates a means for establishing an electrical connection through movement of the thermal protection device (7) using an electrically conductive part (72) which is electrically isolated from said first conductor (71) or from a second conductor of said circuit and is mobile between a blocked position and a short-circuit position; wherein when the heat-sensitive unit (8) is displaced at the predetermined temperature, said mobile electrically conductive part is released from its blocked position and connects said first electric conductor (71) electrically to said second conductor of the electric circuit in said short circuit position which is connected directly electrically upstream from the excitation coil, the second conductor having an electric potential which is different from that of the second terminal before activation of the means for activation, and,
   at least one positive brush (5) which is connected electrically to the first terminal; and a spring (75) between the positive brush (5) and the first electric conductor (71), in order to thrust the positive brush (5) towards the connector, forming the means for displacement of the mobile conductive part (72); in order to allow the spring to displace the mobile conductive part (72) from said initial blocked position to said short circuit position in contact with the first conductor (71).

2. A starter according to claim 1, wherein the machine additionally comprises a means for temperature induced displacement, in order to make it possible to displace the mobile conductive part (72) from the blocked position to the short-circuit position.

3. A starter according to claim 2, wherein the circuit further comprises positive brushes (5, 5'), and wherein the heat-sensitive unit (8) is designed such that, when it is deformed, it makes it possible to connect one of the brushes (5, 5') electrically to the first conductor.

4. A starter according to claim 3, comprising an electrically conductive brush holder with its brush (5), with the heat-sensitive unit (8) making it possible, by means of the means for connection, to connect the first electric conductor (71) to the brush holder electrically.

5. A starter according to claim 4, wherein the mobile conductive part (72) and the brush holder are designed to cooperate by forming a slide connection between them.

6. A starter according to claim 1 , wherein the thermal protection device (7) further comprises an electric isolation unit (74) fitted between the mobile conductive part (72) and the spring (75).

7. A starter according to claim 6, wherein the cage of the positive brush (5) is connected electrically to the first terminal by the mobile conductive part (72) in the blocked position.

8. A starter according to claim 7, which is a direct current electrical machine.

9. A starter according to claim 8, comprising a second protection device (7').

10. A starter according to claim 9, wherein the second conductor is a positive supply brush (5) connected electrically to the mobile conductive part, and wherein the first electric conductor (71) is connected to the earth.

11. System for protection of an electrical machine against overheating, comprising: the starter according to claim 1; an electric supply means comprising a first terminal and a second terminal which are connected electrically respectively to the first and second terminals of the electrical machine (1); a fuse (2) upstream from the electrical machine fitted between the first terminal of the electric supply means and the first electric terminal of the electrical machine (1), in order to disconnect an electric terminal of the electric supply means of the electrical machine (1), when the current which passes through the fuse (2) exceeds a predetermined value for a predetermined time.

12. A starter for a motor vehicle comprising:

a rotary electrical machine including a rotor shaft, a stator including magnets, an inductive coil and a collector (11), and at least a first terminal and a second terminal and an electric circuit connected to these two terminals, the electric circuit comprising an excitation coil in the rotor;

a thermal protection device, (7) which is provided in the electrical machine, comprising: a first electric conductor (71) which is connected electrically to the second terminal and which first electrical conductor forms a part of the frame of rotary electrical machine; a heat-sensitive unit (8) which is disconnected electrically from the electric circuit, and is arranged in the electrical machine in order to be deformed beyond a predetermined temperature, wherein, beyond said predetermined temperature, the deformation of the heat-sensitive unit (8) activates a means for establishing an electrical connection through movement of the thermal protection device (7) using an electrically conductive part (72) which is electrically isolated from said first conductor (71) or from a second conductor of said circuit and is mobile between a blocked position and a short-circuit position; wherein when the heat-sensitive unit (8) is displaced at the predetermined temperature, said mobile electrically conductive part is released from its blocked position and connects said first electric conductor (71) electrically to said second conductor of the electric circuit in said short circuit position which is connected directly electrically upstream from the excitation coil and to said first terminal through a resistor, the second conductor having an electric potential which is different from that of the second terminal before activation of the means for activation, and, at least one positive brush (5) which is connected electrically to the first terminal; and a spring (75) between the positive brush (5) and the first electric conductor (71), in order to thrust the positive brush (5) towards the connector, forming the means for displacement of the mobile conductive part (72); in order to allow the spring to displace the mobile conductive part (72) from said initial blocked position to said short circuit position in contact with the first conductor (71).

13. A starter for a motor vehicle comprising:

a rotary electrical machine including a rotor shaft, a stator comprising windings, an inductive coil and a collector (11), and at least a first terminal and a second terminal and an electric circuit connected to these two terminals, the electric circuit comprising an excitation coil in the rotor;

a thermal protection device, (7) which is provided in the electrical machine, comprising: a first electric conductor (71) which is connected electrically to the second terminal and which first electrical conductor forms a part of the frame of rotary electrical machine; a heat-sensitive unit (8) which is disconnected electrically from the electric circuit, and is arranged in the electrical machine in order to be deformed beyond a predetermined temperature, wherein, beyond said predetermined temperature, the deformation of the heat-sensitive unit (8) activates a means for establishing an electrical connection through movement of the thermal protection device (7) using an electrically conductive part (72) which is electrically isolated from said first conductor (71) or from a second conductor of said circuit and is mobile between a blocked position and a short-circuit position; wherein when the heat-sensitive unit (8) is displaced at the predetermined temperature, said mobile electrically conductive part is released from its blocked position and connects said first electric conductor (71) electrically to said second conductor of the electric circuit in said short circuit position which is connected directly electrically upstream from the excitation coil, the second conductor having an electric potential which is different from that of the second terminal before activation of the means for activation, and, at least one positive brush (5) which is connected electrically to the first terminal; and a spring (75) between the positive brush (5) and the first electric conductor (71), in order to thrust the positive brush (5) towards the connector, forming the means for displacement of the mobile conductive part (72); in order to allow the spring to displace the mobile conductive part (72) from said initial blocked position to said short circuit position in contact with the first conductor (71).

14. A starter for a motor vehicle as in claim 13, wherein:

said stator windings are electrically upstream or downstream or in parallel with said second conductor.

* * * * *